US007616359B2

(12) United States Patent
Sekizawa et al.

(10) Patent No.: US 7,616,359 B2
(45) Date of Patent: Nov. 10, 2009

(54) IMAGE READING APPARATUS, IMAGE FORMING APPARATUS, AND IMAGE FORMING METHOD

(75) Inventors: Hidekazu Sekizawa, Yokohama (JP); Akihiko Someya, Kawasaki (JP); Yusuke Hashizume, Urayasu (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 561 days.

(21) Appl. No.: 11/452,757

(22) Filed: Jun. 14, 2006

(65) Prior Publication Data
US 2007/0291331 A1 Dec. 20, 2007

(51) Int. Cl.
H04N 1/46 (2006.01)
G06F 15/00 (2006.01)
H04N 1/04 (2006.01)

(52) U.S. Cl. .................... 358/509; 358/1.9; 358/475

(58) Field of Classification Search ................ 358/509, 358/510, 505, 514, 520, 518, 475, 1.9, 1.13, 358/513, 530, 480, 504, 512; 382/162, 163, 382/164
See application file for complete search history.

(56) References Cited

U.S. PATENT DOCUMENTS

| | | | | |
|---|---|---|---|---|
| 4,469,437 A * | 9/1984 | Yuasa et al. | ...................... | 355/68 |
| 4,589,776 A * | 5/1986 | Carver et al. | ................ | 356/367 |
| 5,210,600 A * | 5/1993 | Hirata | .......................... | 358/527 |
| 5,296,946 A * | 3/1994 | Kadowaki et al. | ............ | 358/531 |
| 5,387,930 A * | 2/1995 | Toh | .......................... | 348/222.1 |
| 5,663,782 A * | 9/1997 | Saita et al. | ..................... | 355/37 |
| 5,751,401 A * | 5/1998 | Takaoka et al. | ................ | 355/32 |
| 5,871,266 A * | 2/1999 | Negishi et al. | ................. | 353/98 |
| 6,278,529 B1 * | 8/2001 | Akimoto | ...................... | 358/1.9 |
| 2001/0024518 A1 * | 9/2001 | Yaguchi | ...................... | 382/170 |
| 2001/0052991 A1 * | 12/2001 | Oomori | ....................... | 358/1.9 |
| 2004/0105264 A1 * | 6/2004 | Spero | .......................... | 362/276 |
| 2005/0078886 A1 * | 4/2005 | Yushiya et al. | .............. | 382/312 |
| 2006/0007108 A1 * | 1/2006 | Utsumi et al. | ................ | 345/102 |
| 2006/0017944 A1 * | 1/2006 | Nakahanada et al. | .......... | 358/1.8 |
| 2006/0252070 A1 * | 11/2006 | Boege et al. | .................... | 435/6 |
| 2007/0159091 A1 * | 7/2007 | Hirosaki et al. | ............. | 313/512 |

FOREIGN PATENT DOCUMENTS

JP H07-154536 6/1995
JP H11-341222 12/1999

* cited by examiner

Primary Examiner—Madeleine A Nguyen
(74) Attorney, Agent, or Firm—Turocy & Watson, LLP

(57) ABSTRACT

In an image reading apparatus for reading a color document as a monochrome image, an image forming apparatus of the invention includes a composite light source that irradiates the color document and includes plural light sources different in spectral distribution, a sensor to detect the intensity of a reflected light from the color document, a light emission ratio setting unit to changeably set light emission ratios different for the respective light sources, and a light source control unit to control effective light amounts of the plural light sources with the set light emission ratios. According to the image forming apparatus of the invention, when the color document is monochromatically read, the reading is performed with the brightness close to the human visual sensitivity, the user can changeably set color sensitivity, and uneven density can be reduced.

24 Claims, 12 Drawing Sheets

IMAGE READING APPARATUS, IMAGE FORMING APPARATUS, AND IMAGE FORMING METHOD

BACKGROUND OF THE INVENTION

1. Technical Field of the Invention

The present invention relates to an image reading apparatus, an image forming apparatus and an image forming method, and particularly to an image reading apparatus having a monochrome reading function to read a color document as a monochrome image, an image forming apparatus and an image forming method.

2. Related Art

Heretofore, there is a light source switching type color image reading apparatus (for example, a color scanner) or color image forming apparatus (for example, a color copying machine), in which irradiation light sources of plural colors, for example, irradiation light sources of red (R), green (G) and blue (B) are switched to read a color document, and a color image is formed.

In the color image reading apparatus or the color image forming apparatus, a monochrome reading mode is often provided in which a color document is read as a monochrome image and the monochrome image is formed.

On the other hand, by the realization of a blue LED (Light Emitting Diode) with high light emitting efficiency, a mode in which all of three primary colors of red (R), green (G) and blue (B) are constructed of LEDs has become possible. By constructing all irradiation light sources by the LEDs, as compared with a conventional structure using a fluorescent lamp or a cold-cathode fluorescent lamp, the increase in life, improvement in reliability, reduction in size and weight, and the like become possible.

However, in the case where monochrome reading is performed using, for example, only a blue LED, there arises a problem that a letter of blue ink is hard to reproduce. Besides, in the case where monochrome reading is performed using only a red LED, an image of a seal of a vermilion inkpad is hard to reproduce. This phenomenon occurs especially remarkably in a light source with a narrow light emission distribution, such as an LED, and it may cause a problem when reading depending on the color of the document.

The reason why the read output of a document varies according to the color of the document is mainly caused by color sensitivity (sensitivity to light wavelength) determined by the spectral distribution of a light source and the spectral distribution of the document. In an extreme case, there is a case where a specific color on the document can not be read at all, and this specific color is called a dropout color.

In order to solve this problem, a patent document (JP 11-341222 A) discloses a technique in which three LED light sources of red (R), green (G) and blue (B) are used to perform monochrome reading.

The technique disclosed in this patent document 1 is the technique in which the three LED light sources of red (R), green (G) and blue (B) are made to produce a composite output by multiplication of a fixed coefficient ratio (or a coefficient ratio obtained by finely adjusting this) so as to coincide with a human visual sensitivity.

According to the technique disclosed in this patent document, when a limitation is made to only the letter reproduction by various color inks, there is a possibility that the object of eliminating the dropout color can be achieved.

When the monochrome reading of a color document is performed, in addition to the simple elimination of the dropout color, there is a user's request that the density (or brightness) of a reading output be changed according to the kind of color.

For example, in the case where a document includes a blue sky and a red letter, there is a case where it is desired that the sky does not become very dark but is as bright as possible, while the red letter is clearly (rather dark) outputted. Besides, in the case where the document includes a person and a blue letter, there is a case where it is desired that the flesh color of the person is as bright as possible, while the blue letter is clearly (rather dark) outputted.

As stated above, in the case where a document includes plural colors and it is desired that those colors are outputted with different densities (or brightnesses), it is difficult to realize by the composition of the outputs of the three LEDs with the fixed coefficient ratio as disclosed in the patent document.

Besides, the patent document discloses that matching with the human visual sensitivity is performed with the ratio coefficient multiplied to the outputs of the three LEDs. However, since the human visual sensitivity and the LED spectral distribution are originally significantly different from each other, it is conceivable that the description disclosed in the patent document only is insufficient for the achievement of the object to achieve the matching with the human visual sensitivity.

In addition, there has also been a problem that when an original document is irradiated by a light source in which LED elements of plural colors are arranged in an array shape, uneven density occurs in the reading density of a color document because the irradiation beams of the plural colors do not sufficiently overlap with each other on the document.

SUMMARY OF THE INVENTION

The invention has been made in view of the above circumstances, and it is an object to provide an image reading apparatus, an image forming apparatus and an image forming method, in which when a color document is monochromatically read, the reading is performed with brightness close to the human visual sensitivity, the user can changeably set color sensitivity, and uneven density can be reduced.

In order to achieve the object, an image reading apparatus of the invention is an image reading apparatus for reading a color document as a monochrome image and is characterized by including a composite light source that irradiates the color document and includes plural light sources different in spectral distribution, a sensor to detect an intensity of a reflected light from the color document, a light emission ratio setting unit to changeably set light emission ratios different for the respective light sources, and a light source control unit to control effective light amounts of the plural light sources with the set light emission ratios.

Besides, in order to achieve the above object, an image forming apparatus of the invention is an image forming apparatus for reading a color document as a monochrome image and forming the monochrome image and is characterized by including a composite light source that irradiates the color document and includes plural light sources different in spectral distribution, a sensor to detect an intensity of a reflected light from the color document, a light emission ratio setting unit to changeably set light emission ratios different for the respective light sources, a light source control unit to control effective light amounts of the plural light sources with the set light emission ratios, and an image forming unit to form the monochrome image from an output of the sensor.

Besides, in order to achieve the above object, an image forming method of the invention is an image forming method for reading a color document as a monochrome image and forming the monochrome image and is characterized by including a step of irradiating the color document by a composite light source including plural light sources different in spectral distribution, a detection step of detecting an intensity of a reflected light from the color document by a sensor, a light emission ratio setting step of changeably setting light emission ratios different for the respective light sources, a light source control step of controlling effective light amounts of the plural light sources with the set light emission ratios, and an image formation step of forming the monochrome image from image data outputted from the sensor.

According to the image reading apparatus, the image forming apparatus and the image forming method of the invention, when the color document is monochromatically read, the reading is performed at the brightness close to the human visual sensitivity, the user can changeably set the color sensitivity, and the uneven density can be reduced.

BRIEF DESCRIPTION OF THE DRAWINGS

In the accompanying drawings.

DETAILED DESCRIPTION OF THE PREFERRED EMBODIMENTS

Embodiments of an image forming apparatus and an image forming method of the invention will be described with reference to the accompanying drawings.

(1) Structure of Image Forming Apparatus

Figure 1:
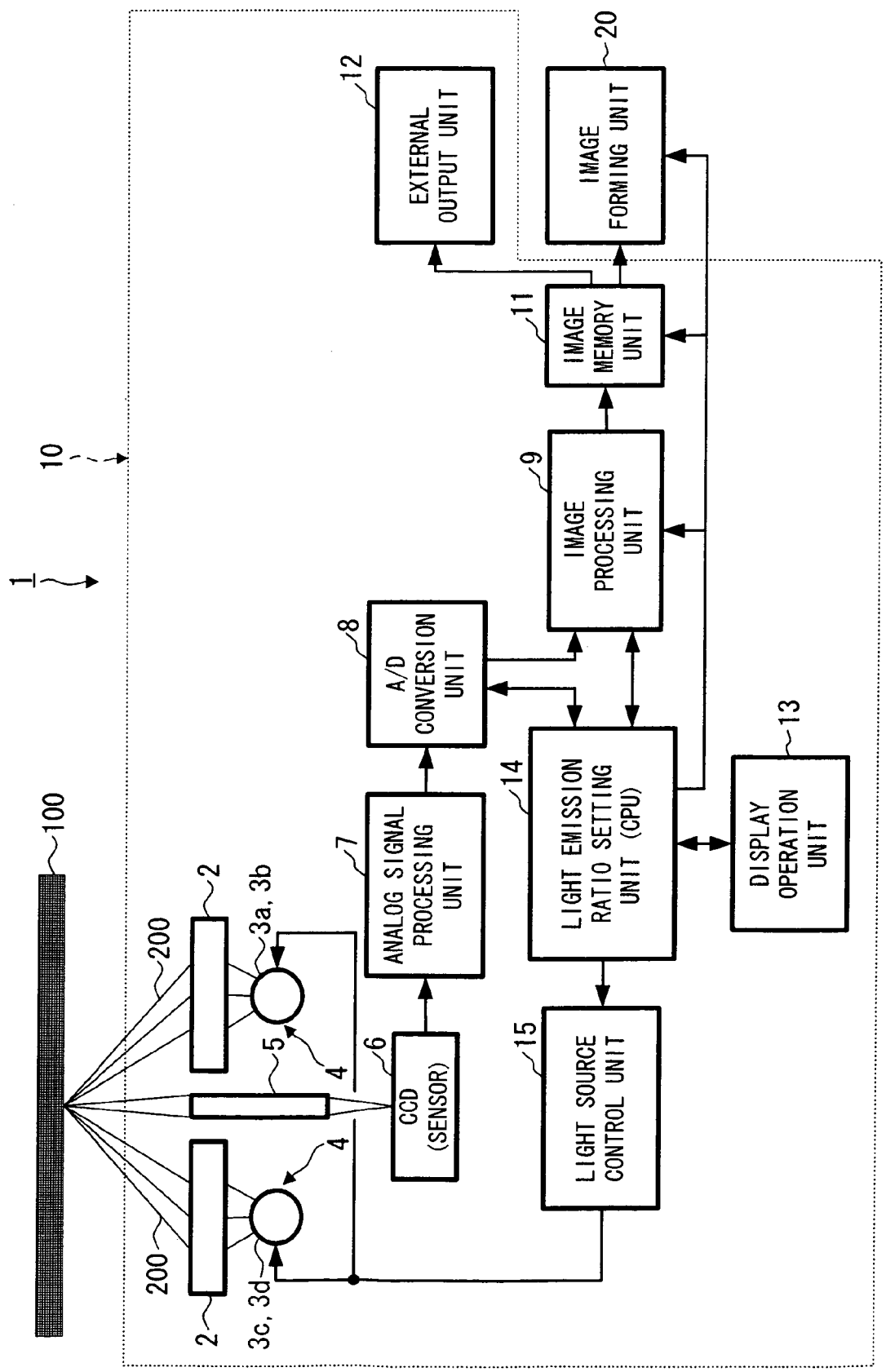
FIG. 1 is a view showing a whole structure example of an image forming apparatus of an embodiment of the invention.

FIG. 1 is a view showing a system structure example of an image forming apparatus 1 of an embodiment of the invention.

The image forming apparatus 1 includes an image reading apparatus 10 and an image forming unit 20. The image reading apparatus 10 is, for example, a scanner apparatus, converts a signal optically read from a document 100 into a digital signal, performs various image processings, and then outputs it as image data to the outside through a LAN or the like. The image forming unit 20 is means for printing the image data, and is, for example, an electrophotographic printer.

The image forming apparatus 1 of the embodiment has a function to read a color document as a monochrome image. In this case, the image forming apparatus 1 may be a monochrome-only machine or may be a color machine having a monochrome read mode.

The image reading apparatus 10 includes, as an optical system, a composite light source 4 including plural light sources 3a, 3b, 3c and 3d (hereinafter simply referred to as a light source 3 when a generic name is given to these) different in spectral distribution (that is, different in color), a Fresnel lens 2 as diffusion means for diffusing emitted light from the light source 3, and a lens for condensing reflected light from a document 100, for example, a cell fox lens 5.

Besides, the image reading apparatus 10 includes an axial CCD sensor (sensor) 6, an analog signal processing unit 7, an A/D conversion unit 8, an image processing unit 9, an image memory unit 11, an external output unit 12, a display operation unit 13, a light emission ratio setting unit 14, and a light source control unit 15.

The reflected light condensed by the cell fox lens 5 is imaged by the CCD sensor 6 and is converted into an electric signal. After this electric signal is converted to have a suitable signal level by the analog signal processing unit 7, it is converted into digital image data by the A/D conversion unit 8. Besides, the A/D conversion unit 8 performs a shading correction to correct the irregularity of a light amount distribution of the light source 3 in a main scanning direction and a sensitivity distribution of the CCD sensor 6 in the main scanning direction.

The image processing unit 9 applies an image processing, such as a space filtering processing, to the image data which has been subjected to the shading correction. The image data subjected to the image processing is temporarily stored in the image memory unit 11, is converted to have a suitable data format by the external output unit 12, and then is outputted to an external equipment through a line such as a LAN.

Besides, the image data stored in the image memory unit 11 is outputted to the image forming unit 20, and image data is printed on a recording medium such as a recording sheet.

The light emission ratio setting unit 14 functions as setting means of a light emission ratio of the light source 3 described later, and functions as the control center of the image reading apparatus 10 and the whole image forming apparatus 1, and includes, for example, a CPU and the like.

The display operation unit 13 is a part corresponding to a so-called control panel, and includes, for example, display means such as a liquid crystal panel and operation means such as a touch panel.

Based on the light emission ratio set by the light emission ratio setting unit 14, the light source control unit 15 performs the light amount control of the respective light sources 3a, 3b, 3c and 3d different in the spectral distribution.

Figure 2:
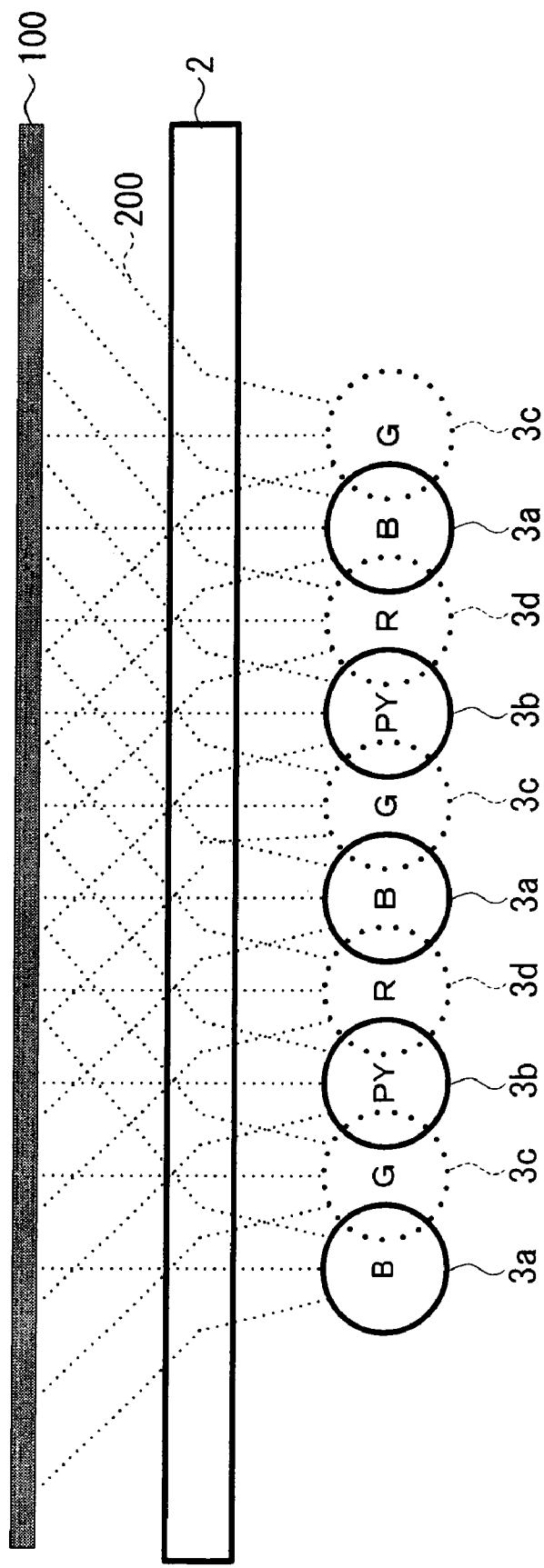
FIG. 2 is a view showing a specific arrangement example of an optical system.

FIG. 2 is a view in which the composite light source 4 including the light sources 3a, 3b, 3c and 3d is seen in a direction perpendicular to FIG. 1. As shown in FIG. 1 and FIG. 2, the composite light source 4 includes a first array in which plural blue (B: Blue) LED elements (light sources 3a) and plural yellow (PY: Pure Yellow) LED elements (light sources 3b) are alternately arranged in the main scanning direction, and a second array in which plural green (G: Green) LED elements (light sources 3c) and plural red (R: Red) LED elements (light sources 3d) are alternately arranged in the main scanning direction.

The Fresnel lenses 2 are provided between the document 100 and the first array and the second array. When viewed from one end in the main scanning direction, as shown in FIG. 1, the Fresnel lenses 2 function to condense the emitted light from the first array and the emitted light from the second array to one line on the document 100.

On the other hand, when viewed in the direction perpendicular to the main scanning direction, as shown in FIG. 2, the Fresnel lenses 2 function to diffuse the emitted lights from the respective LED elements in the main scanning direction. By this diffusion function, it becomes possible to irradiate the emitted lights from the alternately arranged blue LED elements onto the document 100 without gaps in the main scanning direction. Similarly, the emitted lights from the other three color LED elements can be irradiated onto the document 100 without gaps in the main scanning direction. As a result, on the line of the document 100 in the main scanning direction, all the emitted lights from the four-color LED light sources are superimposed (specific color is not dropped), and are combined without causing uneven density.

In the structure shown in FIG. 2, in order to combine the emitted lights from the four-color LED elements without irregularity, the LED elements of the first array and the LED elements of the second array are arranged in a staggered manner. In addition to this, for example, in the case where two-color LED elements are combined, a structure may be such that LED elements (first color) of the first array and LED elements (second color) of the second array are arranged to be opposite to each other.

As stated above, the composite ratio of the color light sources 3a, 3b, 3c and 3d is carried out by controlling the light amounts of the respective light sources 3a, 3b, 3c and 3d by the light source control unit 15 based on the light emission ratio set by the light emission ratio setting unit 14. With respect to this light amount control, the control of the effective light amount is performed by controlling the light emission times of the respective color LEDs (pulse width control). At this time, a variation in light amount due to read timing is made not to occur by controlling the light emission time at sufficiently high speed.

Incidentally, a mode may be made such that instead of the control using the light emission time, or in addition to the control using the light emission time, a current control or voltage control is performed for the LEDs.

The point of the invention is that the composite ratio (light emission ratio) of the light sources 3a, 3b, 3c and 3d is suitably set, so that when the color document is monochromatically read, in addition to the elimination of the dropout color, excellent color sensitivity is realized in the monochrome image. Hereinafter, a setting method of the light emission ratio of the light sources 3a, 3b, 3c and 3d in the embodiment will be described.

(2) Setting Method of Light Emission Ratio According to a First Embodiment

The setting method of the light emission ratio according to the first embodiment is a method in which a standard light emission ratio obtained by a method described below is previously stored in a storage unit 14a provided in the light emission ratio setting unit 14, and the light amount of the light source 3 is controlled with the standard light emission ratio.

In this method, lightness (first lightness Pn) of a sensor output at a time when a color chart of a standard color (hereinafter referred to as a standard color chart) is read by a sensor of the image reading apparatus 10 (in monochrome reading) is needed.

Besides, lightness (second lightness On) at a time when the same standard color chart is irradiated by a standard light source, for example, a xenon light source and the reflected light is viewed with the standard human visual sensitivity is also needed.

Then, the standard light emission ratio is obtained such that the first lightness Pn becomes almost equal to the second lightness On. More specifically, the standard light emission ratio is obtained by the following procedure.

First, how to obtain the second lightness On will be explained.

Figure 3:
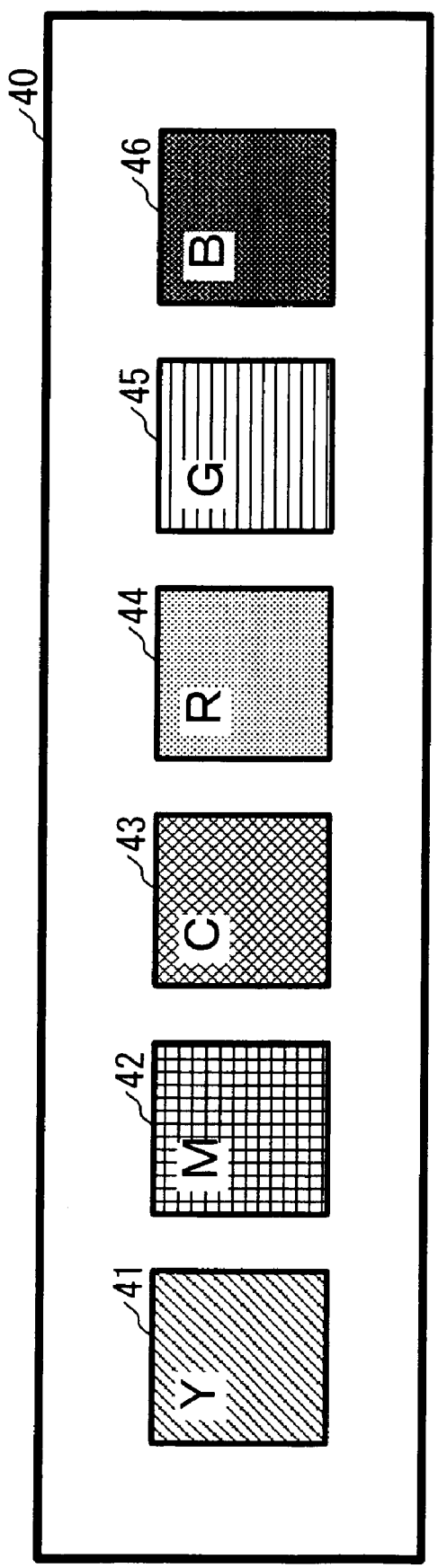
FIG. 3 is a view showing an example of a standard color chart.

FIG. 3 is a view showing an example of a standard color chart 40. Although specific colors of the standard color chart 40 and the number thereof are not particularly limited, in the following description, the description will be made while using the standard color chart of 6 colors (yellow (Y) 41, magenta (M) 42, cyan (C) 43, red (R) 44, green (G) 45, and blue (B) 46) exemplified in FIG. 3 (incidentally, there is also a case where each color chart is called a standard color patch).

Figure 4:
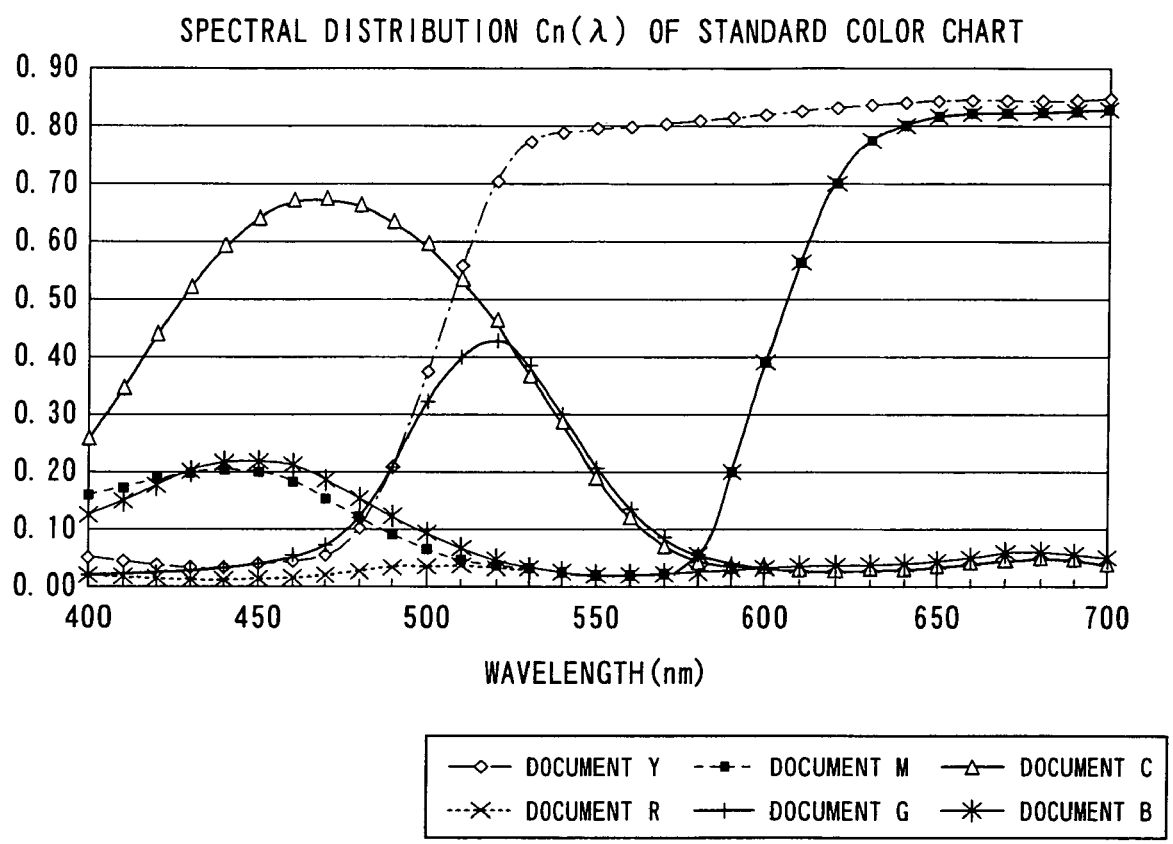
FIG. 4 is a view showing an example of a spectral distribution of the standard color chart.

FIG. 4 is a view showing spectral distributions $Cn(\lambda)$ (n=1 to 6) for the respective standard color charts (41 to 46).

Figure 5:
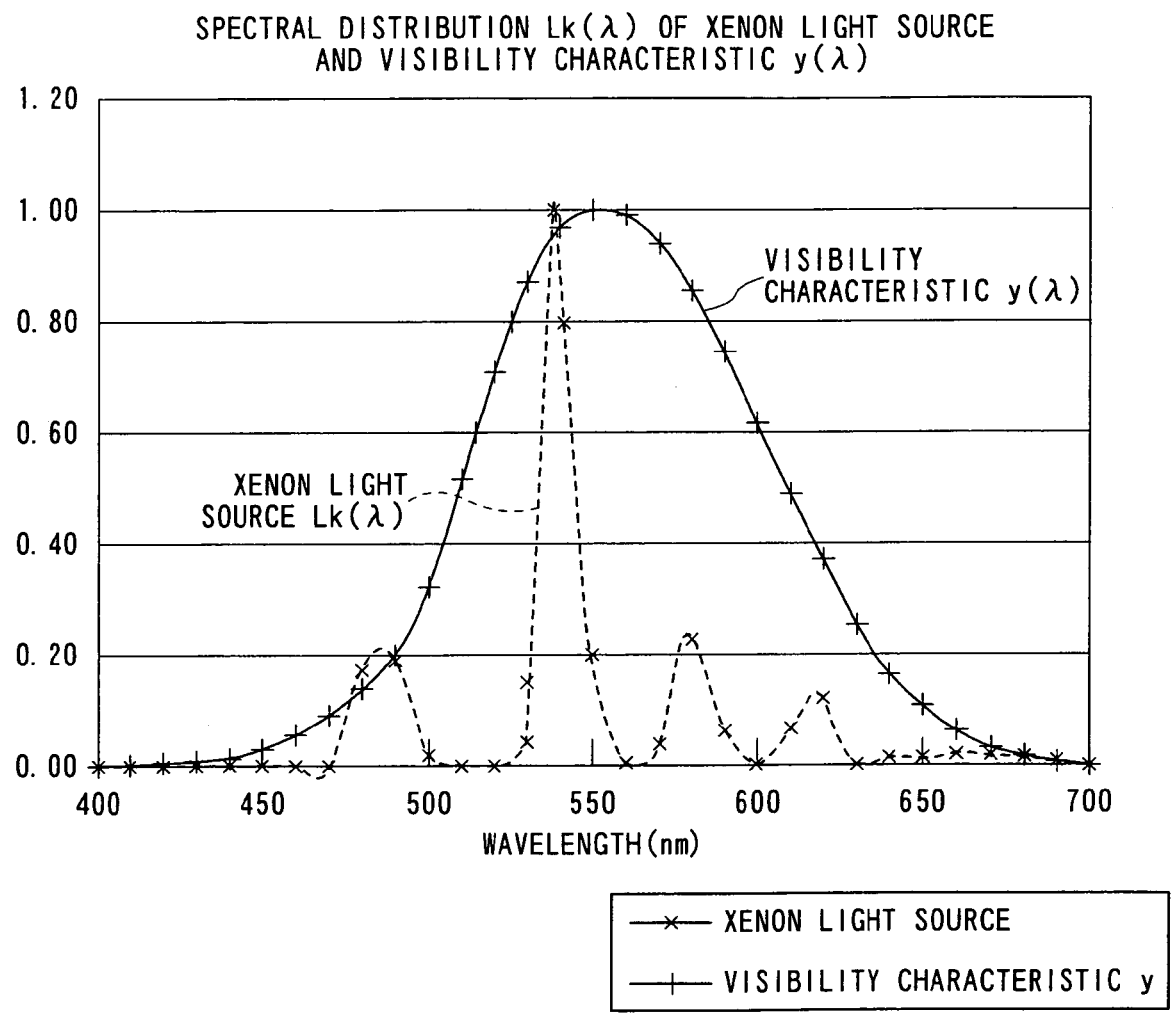
FIG. 5 is a view showing an example of a spectral distribution of a xenon light source and a visibility characteristic.

Meanwhile, FIG. 5 is a view showing a spectral distribution $Lk(\lambda)$ of a xenon light source as a standard light source and a spectral distribution $y(\lambda)$ of a standard human visual characteristic. Here, the spectral distribution $y(\lambda)$ is a color matching function $y(\lambda)$ in, for example, a CIE standard colorimetric system.

At this time, the second lightness On for each of the standard color charts of 6 colors is expressed by the following (expression 1).

$$On = \int L_k(\lambda)Cn(\lambda)y(\lambda)d\lambda \quad (n = 1 \text{ to } 6) \quad \text{(expression 1)}$$

Here, the integration range is the range of, for example, from 400 nm to 700 nm with respect to the wavelength $\lambda$.

Next, how to obtain the first lightness Pn will be explained.

Figure 6:
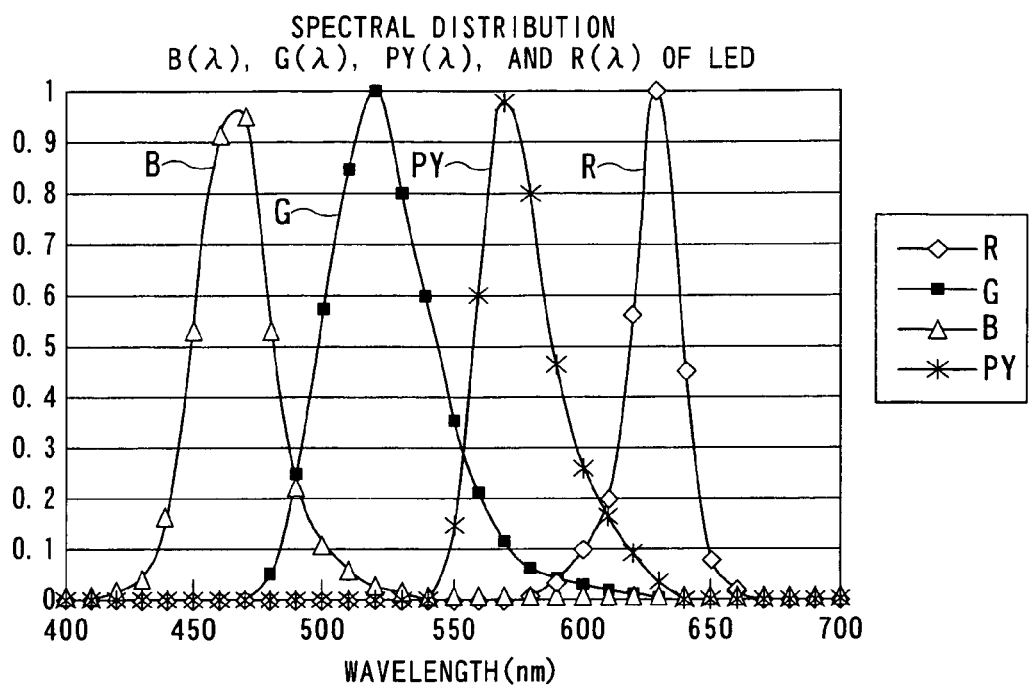
FIG. 6 is a view showing an example of respective spectral distributions of four-color LED light sources.

FIG. 6 is a view showing an example of respective spectral distributions $B(\lambda)$, $G(\lambda)$, $PY(\lambda)$ and $R(\lambda)$ of the light sources 3 of four colors (blue (B), green (G), yellow (PY) and red (R)) included in the image reading apparatus 10.

When light emission ratios for the respective light sources 3 of blue (B), green (G), yellow (PY) and red (R) are made m1, m2, m3 and m4, a composite spectral distribution $La(\lambda)$ of the composite light source 4 becomes the following (expression 2).

$$La(\lambda)=m1*B(\lambda)+m2*G(\lambda)+m3*PY(\lambda)+m4*R(\lambda) \quad \text{(expression 2)}$$

Figure 7:
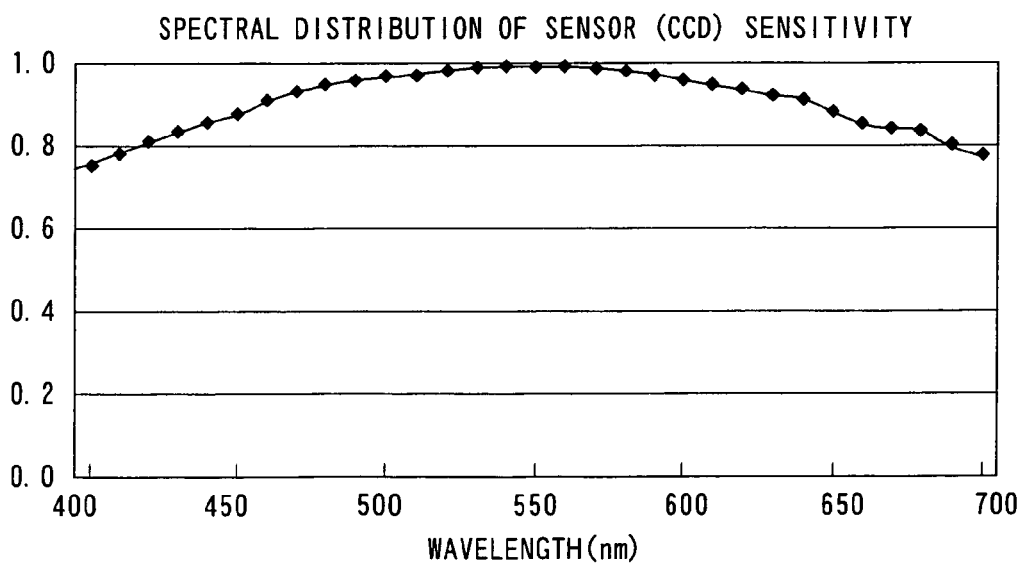
FIG. 7 is a view showing an example of a spectral distribution of sensitivity of a CCD sensor.

Besides, FIG. 7 is a view showing an example of a spectral distribution $S(\lambda)$ of the CCD sensor 6 included in the image reading apparatus 10. From the composite spectral distribution $La(\lambda)$ of the composite light source 4, the spectral distributions $Cn(\lambda)$ of the respective standard color charts, and the spectral distribution $S(\lambda)$ of the CCD sensor 6, the first lightness Pn outputted from the CCD sensor 6 is given by the following (expression 3).

$$Pn = \int La(\lambda)Cn(\lambda)S(\lambda)d\lambda \quad (n = 1 \text{ to } 6) \quad \text{(expression 3)}$$

Incidentally, similarly to the (expression 1), the integration range is the range of from 400 nm to 700 nm with respect to the wavelength λ.

Next, the square sum E of errors between the first lightness Pn and the second lightness On with respect to the respective standard color charts is obtained by the following (expression 4), $$E = \sum_n |On - Pn|^2 \quad \text{(expression 4)}$$

Then, the light emission ratios m1, m2, m3 and m4 are obtained such that the square sum E of the errors is minimized. Incidentally, the respective light emission ratios are positive values. This problem is a nonlinear optimization problem, and can be obtained by a well-known hill-climbing method or the like. The following indicate only the result.

m1=0.46 m2=0.73 m3=0.04 m4=1.14 (expression 5)

The respective light emission ratios become the standard light emission ratios to be obtained. The standard light emission ratios are stored in the storage unit 14a of the light emission ratio setting unit 14, and when the light amounts of the respective light sources 3 are controlled by the light source control unit 15 based on the standard light emission ratios, the composite spectral distribution La(λ) of the composite light source 4 becomes $$La(\lambda)=0.46*B(\lambda)+0.73*G(\lambda)+0.04*PY(\lambda)+1.14*R(\lambda) \quad \text{(expression 6)}$$

Figure 8:
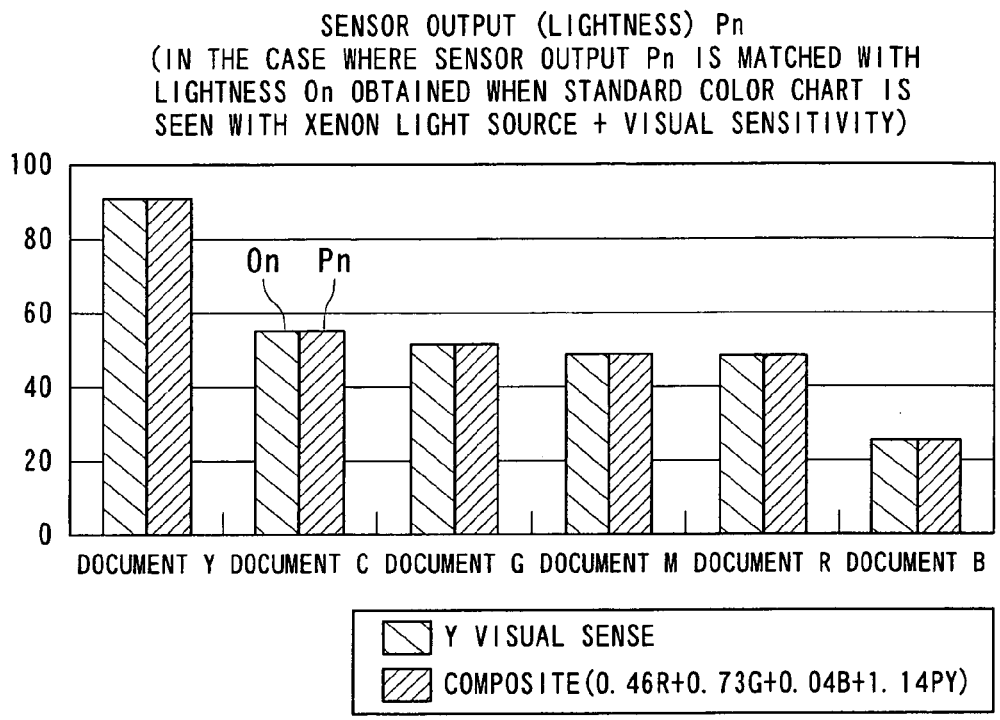
FIG. 8 is a view showing an example of lightness (second lightness) On when the standard color chart is viewed with a xenon light source and a visual sensitivity characteristic, and sensor output lightness (first lightness) Pn.

FIG. 8 shows the second lightness On obtained by the (expression 1) and the first lightness Pn obtained by substituting the (expression 6) for the (expression 3) with respect to the respective standard color charts. Both are almost coincident with each other, which is the natural result from the above derivation process.

An operation mode in which the standard light emission ratios obtained in this way are set for the respective light sources 3 and the monochrome reading is performed will be referred to as a first "standard" mode in order to make a distinction from other modes described later.

Figure 9:
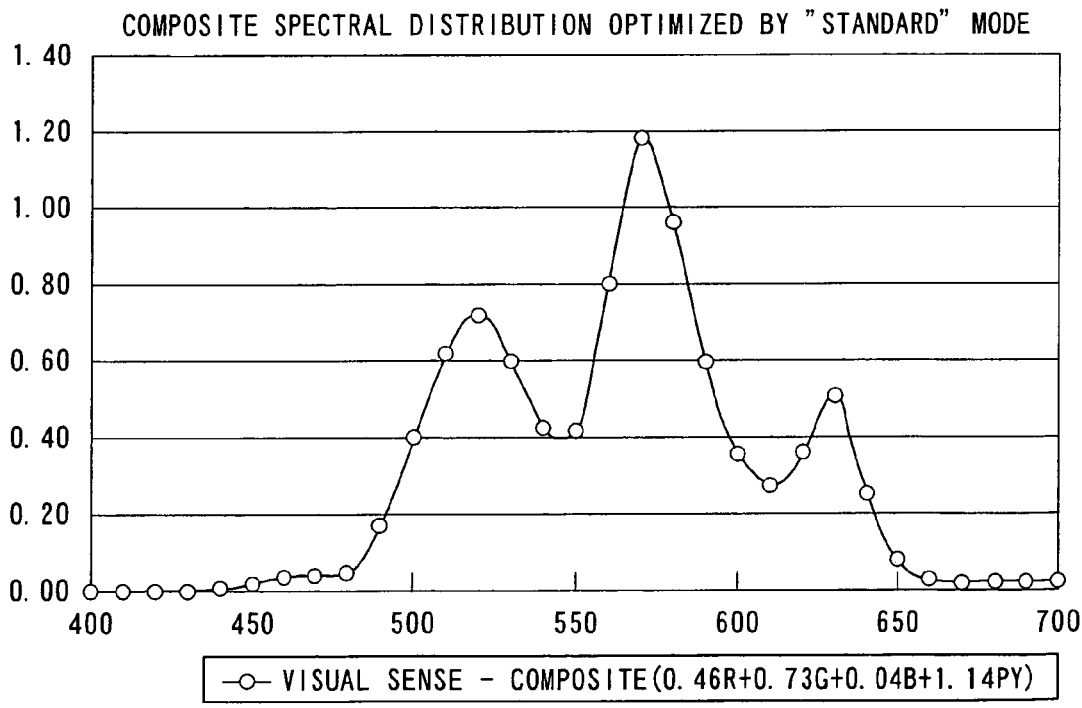
FIG. 9 is a view showing an example of a composite spectral distribution of a composite light source optimized in a "standard" mode.

FIG. 9 shows the composite spectral distribution La(λ) (spectral distribution indicated by the (expression 6)) realized by the first "standard" mode for reference.

In the above description, although the spectral distribution of the xenon light source is used as the spectral distribution of the standard light source, an imaginary standard light source, for example, a CIE standard illuminant of the A light source or the like, or a CIE supplementary standard illuminant of $D_{50}$ or the like may be used.

In the calculation method of the light emission ratio according to the first embodiment, the composite spectral distribution of the light source 3 is not simply made to approach the spectral distribution of the standard light source, but the light emission ratio is calculated in such a manner that the lightness (first lightness) outputted from the CCD sensor 6 is made to approach the lightness (second lightness) which appears to be felt under the standard light source through the human visual sensitivity. Thus, the natural color sensitivity closer to the human sense can be realized.

Besides, since the result of the optimization is directly expressed as the lightness to the standard color chart as shown in FIG. 8, there is also a merit that the evaluation of the result of the optimization is easy.

(3) Setting Method of Light Emission Ratios According to Second Embodiment

Next, the setting method of light emission ratios according to the second embodiment will be described. The first embodiment is the mode in which the previously calculated standard light emission ratios are set (stored) in the storage unit 14a of the light emission ratio setting unit 14. Besides, in order to calculate the standard light emission ratios, the spectral distribution data shown in FIG. 4 to FIG. 6 are required.

On the other hand, in the second embodiment, these spectral distribution data are not required. The standard color charts are directly read by the image reading apparatus 10, and the standard light emission ratios are determined by a determination sequence executed in the light emission ratio setting unit 14.

Figure 10:
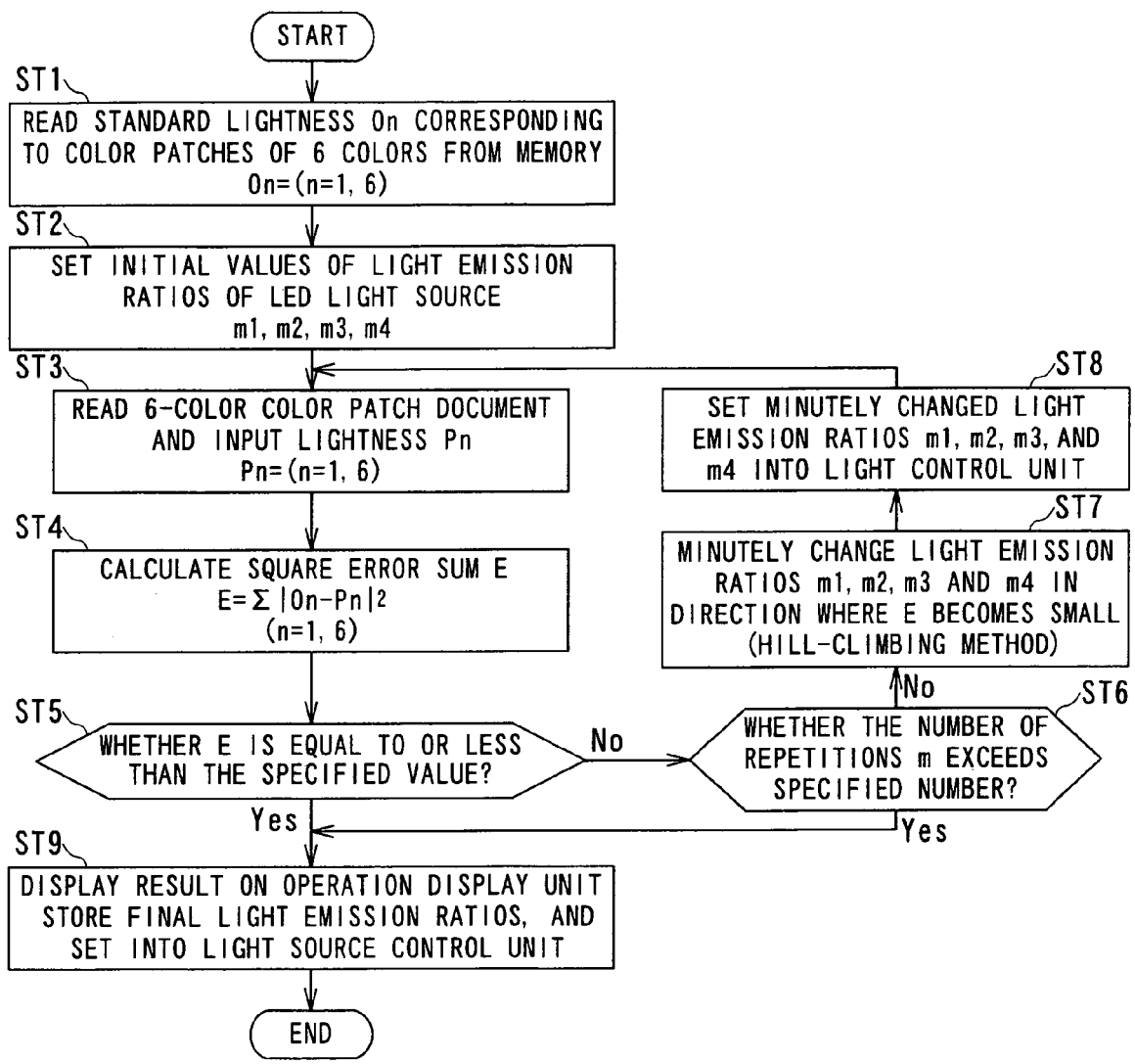
FIG. 10 is a flowchart showing a processing flow of a determination sequence.

FIG. 10 is a flowchart for explaining the determination sequence.

In the second embodiment, it is assumed that standard lightness On (in FIG. 8, the lightness On for the respective standard color patches, and the lightness called the "second lightness" in the first embodiment) for the standard color chart is previously stored in the storage unit 14a of the light emission ratio setting unit 14 by suitable means.

At step ST1 of the determination sequence, the standard lightness On for 6 colors (n=1 to 6) is read from the storage unit 14a.

Next, the light emission ratio setting unit 14 sets m1 to m4 as initial values of the light emission ratios for the light source control unit 15. The light source control unit 15 controls the four-color light amounts of the light sources 3 based on the set initial values m1 to m4 (step ST2).

At step ST3, standard color patches of 6 colors set by the user on the document table of the image reading apparatus 10 are actually read by the image reading apparatus 10. The read output of the CCD sensor 6 is inputted as measured lightness Pn (n=1 to 6) of the respective colors to the light emission ratio setting unit 14.

Next, the light emission ratio setting unit 14 calculates the square error sum E of the standard lightness On and the measurement lightness Pn by the same expression as the (expression 4) (step ST4).

Step ST5, step ST7 and step ST8 represent a repeated loop to obtain the light emission ratios m1 to m4 by the hill-climbing method so that the square error sum E becomes a specified threshold or less.

Specifically, first, m1 to m4 are minutely changed one by one in sequence to obtain the measurement lightness Pn, the light emission ratio at which the square error sum E is changed most significantly (becomes smallest), and a new set of light emission ratios in which only the most significantly changed light emission ratio is changed (minute change is given to only one light emission ratio, and the other three light emission ratios are returned to the original values) is obtained. With respect to the new set of light emission ratios, four light emission ratios are further minutely changed one by one, the light emission ratio at which the square error sum E is most significantly changed (becomes smallest) is found, and the light amounts of the light sources 3 are controlled with a new set of light emission ratios in which only the most significantly changed light emission ratio is changed. Hereinafter, this cycle is repeated, the square error sum E is gradually decreased, the repeated loop is exited when the square error sum E becomes a specified threshold or less (yes at step ST5), and values m1 to m4 of the light emission ratios at that time are stored as the standard light emission ratios into the storage unit 14a of the light emission ratio setting unit 14.

The determination sequence is ended by the processing to this point (that is, the optimization of the light emission ratio is ended), and in the image reading operation after this, the light amounts of the light sources 3 are controlled with the standard light emission ratios stored in the storage unit 14a.

The operation mode in which the standard light emission ratios determined by the above sequence are set for the respective light sources 3 and the monochrome reading is performed will be referred to as a second "standard" mode.

Incidentally, according to circumstances, there is also a case where it takes much time to perform the optimization. Then, as indicated at step ST6 of FIG. 10, a processing may be made such that the number of repetitions is counted, and in the case where the number of repetitions becomes a specified number or more, the loop is forcibly exited. In this case, the value of the square error sum E is displayed on a "ΔE" display 39 or the like of the after-mentioned display operation unit 13 (see FIG. 15), or a display that sufficient optimization could not be performed may be performed.

Incidentally, in the hill-climbing method, in the case where the initial value is unsuitable, there can occur a case where convergence occurs to a minimum point different from the optimum value. Accordingly, it is preferable that a value close to the optimum value within a possible range is made the initial value.

According to the second embodiment, even in the case where there is no data relating to the spectral distribution, the measurement lightness Pn almost coincident with the standard lightness On for the standard color chart exemplified in FIG. 8 can be easily obtained using the actual machine of the image reading apparatus 10.

(4) Setting Method of Light Emission Ratio According to Third Embodiment

According to descriptions of image data to be read, there is a case where it is desired that the lightness (or density at the time of printing) is somewhat changed according to the color.

For example, in the case where a color image including a portrait and a blue letter is monochromatically read, there is a case where it is desired that the flesh color of the person is read to be brighter, while the blue letter is read to be darker (with high density). That is, there is a demand that the lightness of a color close to the flesh color, such as magenta (M) or red (R), is read to be bright, while a color close to the blue ink, such as cyan (C) or blue (B), is read to be dense.

In order to meet such a request, the light emission ratio setting unit 14 includes a second determination sequence. The second determination sequence is basically the same as the determination sequence shown in FIG. 10. However, a difference is that a quasi-standard lightness On', instead of the standard lightness On, previously stored in the storage unit 14a of the light emission ratio setting unit 14 is read at step ST1.

As the quasi-standard lightness On', for example, as the representative of the flesh color system, the lightness of yellow (Y), magenta (M) or red (R) is set to be higher than the standard lightness On by about ten percents, and as the representative of the blue ink, the lightness of cyan (C) or blue (B) is set to be lower than the standard lightness On by about ten percents.

In the second determination sequence, the optimization is performed with respect to this quasi-standard lightness On', and as a result, for example, following quasi-light emission ratios m1' to m4' can be obtained.

$m1'=1.53$ $m2'=0.45$ $m3'=0.00$ $m4'=1.19$ (expression 7)

Figure 11:
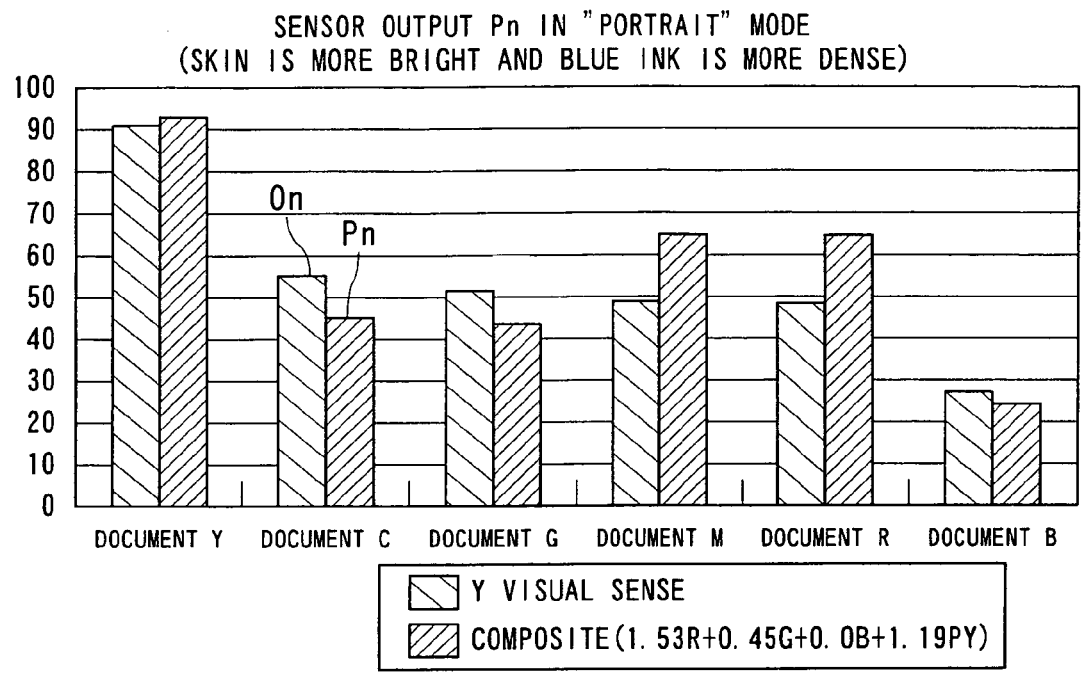
FIG. 11 is a view showing an example of sensor output lightness Pn in a "portrait" mode.

The above quasi-light emission ratios are stored in the storage unit 14a of the light emission ratio setting unit 14, and the light amounts of the respective light sources 3 are controlled by the light source control unit 15 based on the standard light emission ratios. As a result, the measurement lightness Pn (n=1 to 6) as shown in FIG. 11 is obtained. In the measurement lightness Pn, the lightness close to the foregoing quasi-standard lightness On' can be realized.

Figure 12:
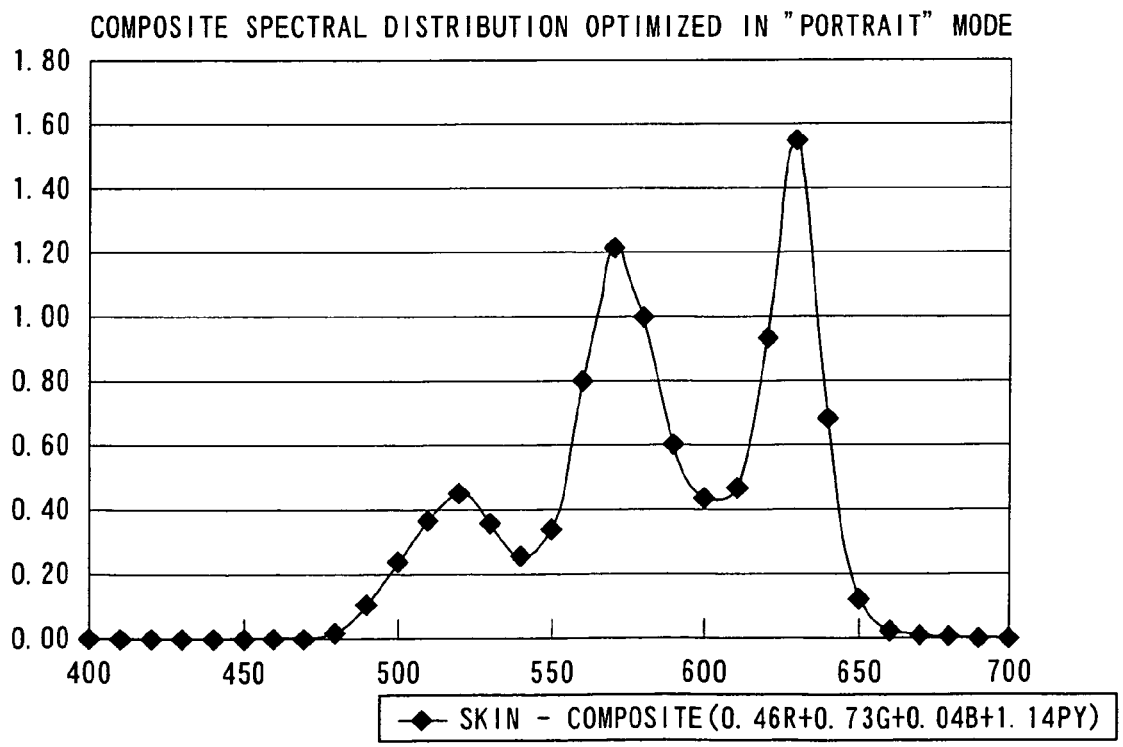
FIG. 12 is a view showing an example of a composite spectral distribution of a composite light source optimized in the "portrait" mode.

FIG. 12 shows a composite spectral distribution $La(\lambda)$ of the composite light source 4 at this time.

$La(\lambda)=1.53*B(\lambda)+0.45*G(\lambda)+0.00*PY(\lambda)+1.19*R(\lambda)$ (expression 8)

According to the third embodiment, the flesh color can be set to be brighter than normal, and the blue letter can be set to be denser than normal (hereinafter, this operation mode will be referred to as a "portrait" mode).

On the other hand, in a landscape or the like, there is a case where it is desired that the color of the sea or sky does not become very dark, while green of a mountain is densely outputted. In such a case, the quasi-standard lightness On' is set in which cyan (C) and blue (B) corresponding to the color of the sea or sky are bright, and green (G) becomes dark, and the quasi-light emission ratios m1' to m4' at which the square error sum E becomes a minimum have only to be obtain similarly to the above. In this case, the quasi-light emission ratios m1' to m4' become, for example, as follows.

$m1'=0.19$ $m2'=0.42$ $m3'=1.93$ $m4'=1.31$ (expression 9)

Figure 13:
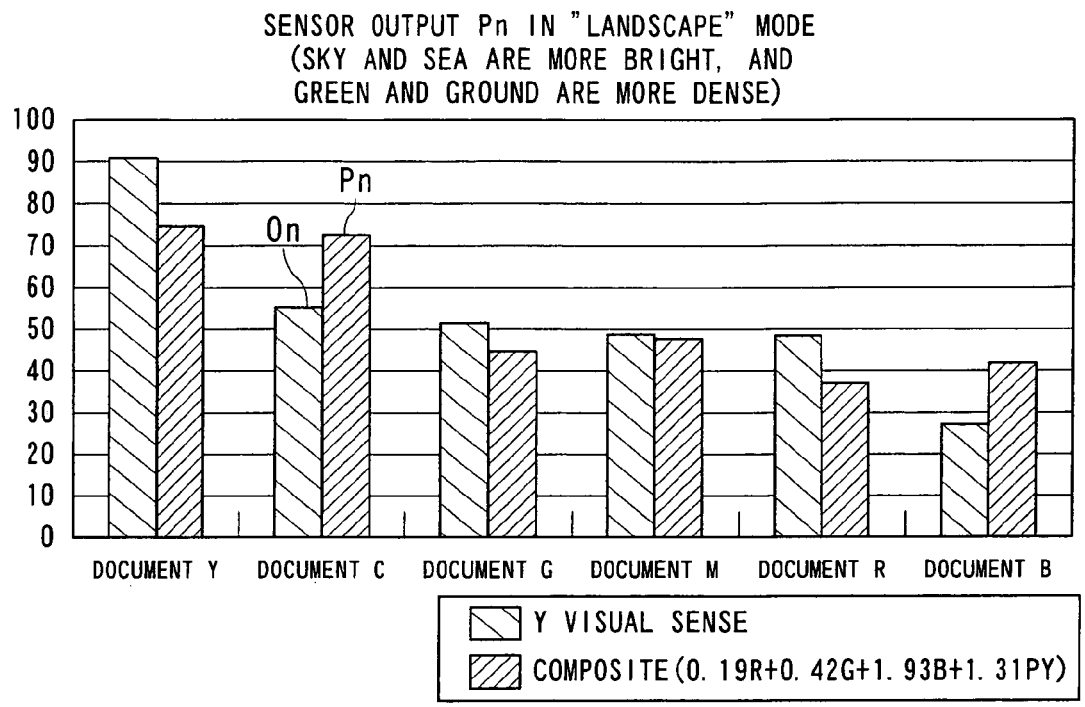
FIG. 13 is a view showing an example of sensor output lightness Pn in a "landscape" mode.

As a result, the measurement lightness Pn (n=1 to 6) as shown in FIG. 13 is obtained.

Figure 14:
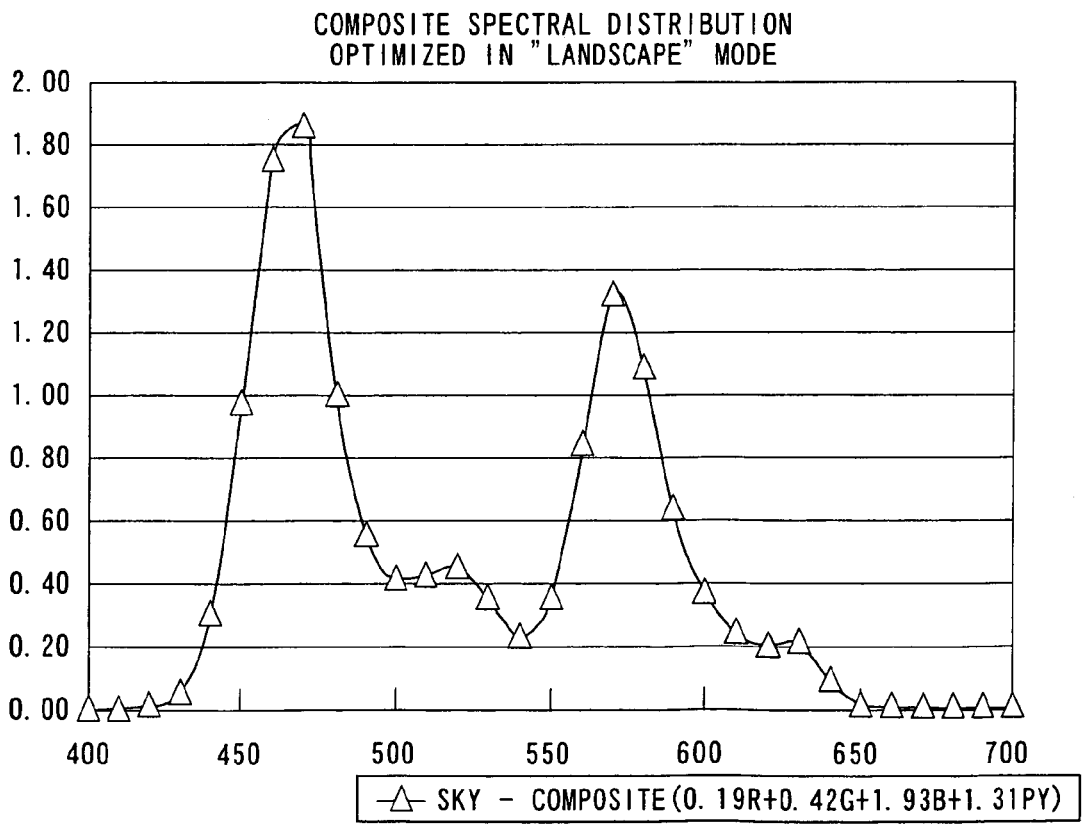
FIG. 14 is a view showing an example of a composite spectral distribution of a composite light source optimized in the "landscape" mode.

FIG. 14 shows a composite spectral distribution $La(\lambda)$ of the composite light source 4 at this time.

$La(\lambda)=0.19*B(\lambda)+0.42*G(\lambda)+1.93*PY(\lambda)+1.31*R(\lambda)$ (expression 10)

Incidentally, the operation mode with the light emission ratios will be hereinafter referred to as a "landscape" mode.

According to the third embodiment, in addition to the realization of the lightness to the standard color chart, the color sensitivity according to the preference of the user can be easily realized by performing a control so that the output lightness of the CCD sensor 6 approaches the quasi-standard lightness in which the lightness to the standard color chart is partially corrected.

(5) Setting Method of Light Emission Ratio According to Fourth Embodiment

The fourth embodiment is the embodiment in which the range of change by the user is expanded further than the third embodiment. Before the description of the fourth embodiment is made, an example of an operation method of the image reading apparatus 10 in the first to the fourth embodiments will be described.

Figure 15:
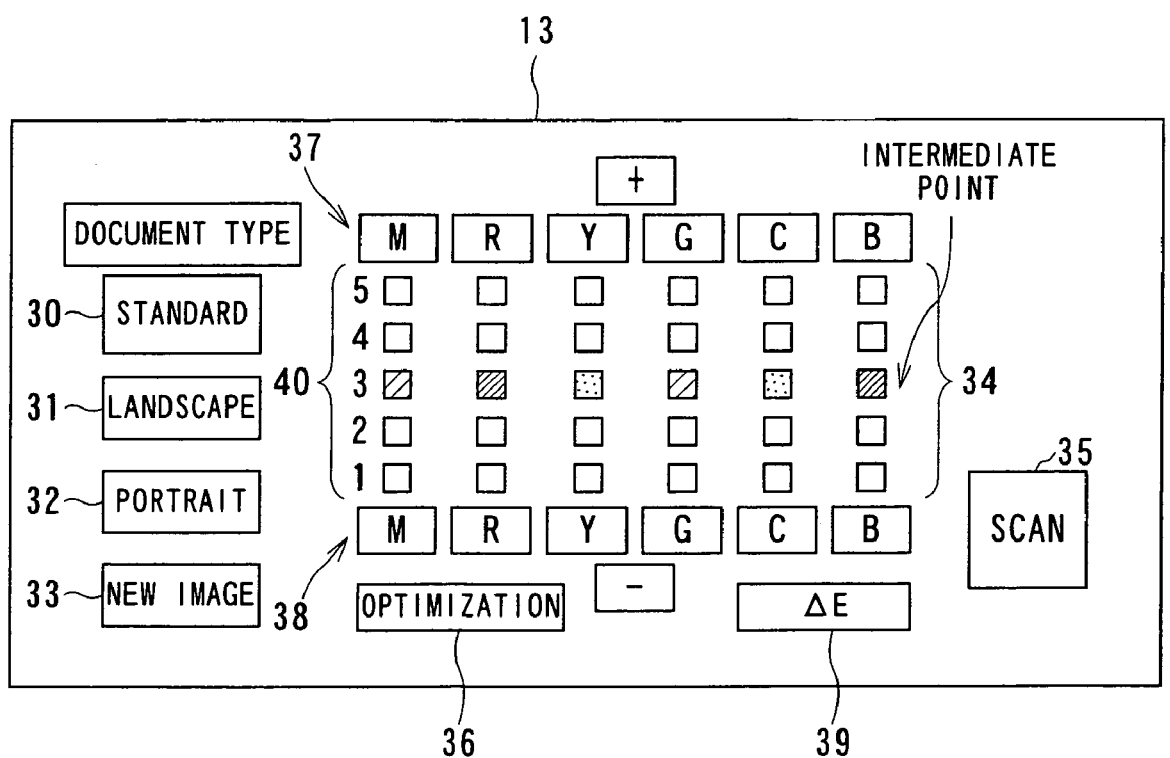
FIG. 15 is a view showing an outer appearance example of a display operation unit.

FIG. 15 is a view showing an outer appearance example of the display operation unit 13 of the image reading apparatus 10 (or the image forming apparatus 1).

The display operation unit 13 is constructed by superimposing, for example, a liquid crystal display panel and a touch panel. Switches to set operation modes corresponding to document types, such as a "standard" 30, a "landscape" 31, a "portrait" 32, and a "new image" 33, are provided in the left column of the display operation unit 13.

When the "standard" mode is selected, as described in the first embodiment, the previously stored standard light emission ratios are set by the light emission ratio setting unit 14 into the light source control unit 15 (first standard mode). Alternatively, as described in the second embodiment, the standard light emission ratios determined by the determination sequence are set into the light source control unit 15 (second "standard" mode).

On the other hand, when the "landscape" mode or the "portrait" mode is selected, as described in the third embodiment, the quasi-standard light emission ratios determined by the second determination sequence are set into the light source control unit 15.

The display and operation part relating to the fourth embodiment is disposed at the center part of the display operation unit 13.

For example, a structure is made such that a lightness display 34 corresponding to 6 colors of magenta (M), red (R), yellow (Y), green (G), cyan (C) and blue (B) can be displayed by a five-stage display 40 ("5", "4", "3", "2", "1"). Besides, switches 37 and 38 to increase/decrease the lightnesses of the respective colors ("M", "R", "Y", "G", "C", "B") are provided as 6 increase/decrease switches at each of the upper part and lower part of the lightness display 34, and a structure is made such that when an upper switch is pressed, the lightness of a corresponding color becomes high, and when a lower switch is pressed, the lightness of a corresponding color becomes low.

Figure 16:
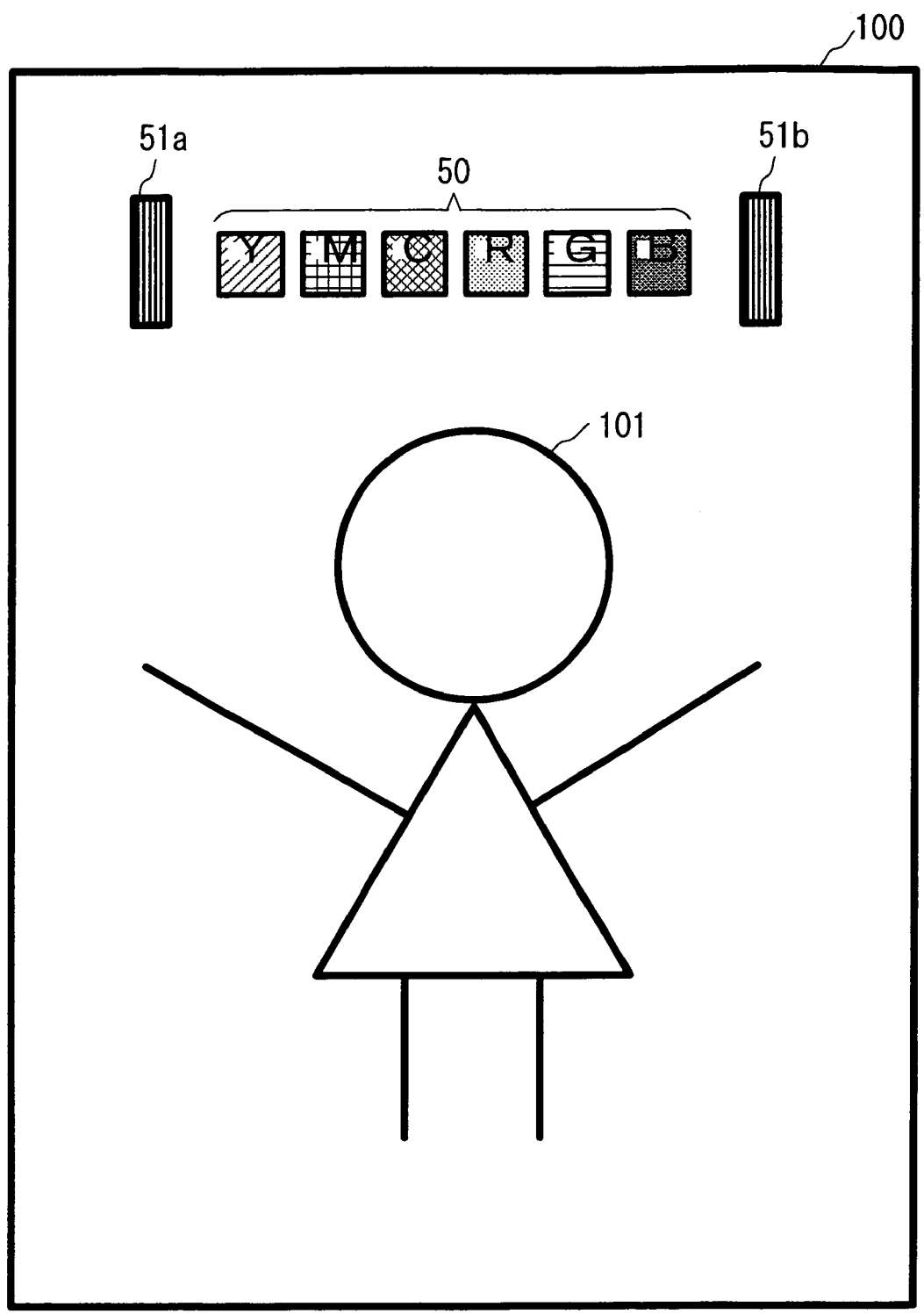
FIG. 16 is a view showing an example of a standard color patch which is superimposed on a document and is read.

In the fourth embodiment, as exemplified in FIG. 16, a color chart including standard color patches 50 is superimposed on a document 100 and is set on a document table, and is read by the image reading apparatus 10 (a "SCAN" switch 35 of the display operation unit 13 is depressed). Although the standard color patches 50 are basically the same as the color patches shown in FIG. 3, a start identification mark 51a and an end identification mark 51b are provided at both sides of the standard color patches 50.

By detecting the start identification mark 51a and the end identification mark 51b, even in the document 100 including a complicated image 101 such as a portrait or a nature picture, it becomes possible to reliably read the standard color patch 50. Incidentally, the start identification mark 51a and the end identification mark 51b can be realized using a well-known technique of a bar code or the like.

The read lightnesses of the standard color patches 50 are all displayed at the intermediate point (position indicated by level "3") of the lightness display part of the display operation unit 13. In the case where the user changes the lightness, he/she suitably presses the increase/decrease switch 37 or 38, and sets the relative lightness to the standard color patch 50.

The lightnesses obtained by reading the standard color patch 50 and the lightnesses increased/decreased by the user are added/subtracted, and are stored, as desired lightnesses On" to the respective standard color patches 50, into the storage unit 14a of the light emission ratio setting unit 14.

Next, in accordance with the processing of the flowchart of FIG. 10 (where, the standard lightness On of step ST1 is replaced by the desired lightness On", and this sequence is called a third determination sequence), light emission ratios m1 to m4 are obtained by the hill-climbing method. The third determination sequence is started by depressing, for example, an "optimization" switch 36 of the display operation part 13. The light emission ratios m1 to m4 determined by the third determination sequence are set in the photoelectric control unit 15. Thereafter, the user again reads the document 100.

When it is confirmed that the read image (or printed image) is the image desired by the user, for example, the "optimization" switch is again depressed, and the light emission ratios m1 to m4 determined by the third determination sequence are stored as the desired light emission ratios m1 to m4 into the storage unit 14a.

Subsequently, the "new image" mode is set by the depression of the "new image" switch, and the desired light emission ratios m1 to m4 are set by the light emission ratio setting unit 14 into the light control unit 15.

As described above, according to the image reading apparatus, the image forming apparatus and the image forming method, when a color document is monochromatically read, reading is performed at the brightness close to the human visual sensitivity, and the user can changeably set the color sensitivity. Besides, the uneven density can be reduced by the diffusion function of the Fresnel lens.

Incidentally, the invention is not limited to the embodiments as described, but can be embodied at a practical stage while structural elements are modified within the range not departing from the gist. Besides, various inventions can be formed by suitable combinations of plural structural elements disclosed in the embodiments. For example, some structural elements may be deleted from all the structural elements disclosed in the embodiment. Further, structural elements of different embodiments may be suitably combined.

What is claimed is:

1. An image reading apparatus for reading a color document as a monochrome image, comprising:
    a composite light source that irradiates the color document and includes plural light sources different in spectral distribution;
    a sensor configured to detect an intensity of a reflected light from the color document;
    a light emission ratio setting unit configured to changeably set light emission ratios different for the respective light sources; and
    a light source control unit to control effective light amounts of the plural light sources with the set light emission ratios, wherein,
    the light emission ratio setting unit includes a storage unit,
    the light emission ratio setting unit sets standard light emission ratios stored in the storage unit into the light source control unit
    the standard light emission ratios are calculated such that
    a product of a composite spectral distribution obtained by combining spectral distributions of the plural light sources with specified light emission ratios, spectral distributions of standard color charts, and a spectral distribution of a sensitivity of the sensor is integrated with respect to wavelengths to obtain first lightnesses for the standard color charts,
    a product of a spectral distribution of a standard light source, the spectral distributions of the standard color charts, and a spectral distribution of a visibility characteristic is integrated with respect to wavelengths to obtain second lightnesses for the standard color charts, and a square sum of errors between the first lightnesses and the second lightnesses with respect to the plural standard color charts different in color becomes a minimum.

2. The image reading apparatus according to claim 1, wherein, the visibility characteristic is a color matching function $y(\lambda)$ in a CIE standard colorimetric system, and the standard light source is a xenon light source.

3. The image reading apparatus according to claim 1, wherein, the visibility characteristic is a color matching function $y(\lambda)$ in a CIE standard colorimetric system, and the standard light source is a CIE standard illuminant or a CIE supplementary illuminant.

4. The image reading apparatus according to claim 1, wherein, the light emission ratio setting unit includes a storage unit configured to store standard lightnesses set for plural standard color charts, and standard light emission ratios determined by a determination sequence, in the determination sequence, measurement lightnesses for the plural respective standard color charts obtained from the sensor when the plural standard color charts are irradiated by the plural light sources with specified light emission ratios are inputted, a square sum of errors between the standard lightnesses and the measurement lightnesses for the plural standard color charts is obtained, a change of the light emission ratios and setting of the changed light emission ratios into the light source control unit are repeated to decrease the square sum of the errors by a hill-climbing method, and the light emission ratios at a time when the square sum of the errors becomes a specified threshold or less are determined to be the standard light emission ratios, and the light emission ratio setting unit sets the standard light emission ratios into the light source control unit.

5. The image reading apparatus according to claim 4, further comprising a display operation unit, wherein, the storage unit further stores quasi-standard lightnesses set for the plural respective standard color charts and quasi-standard light emission ratios determined by a second determination sequence, in the second determination sequence, measurement lightnesses for the plural respective standard color charts obtained from the sensor when the plural standard color charts are irradiated by the plural light sources with specified light emission ratios are inputted, a square sum of errors between the standard lightnesses and the measurement lightnesses for the plural standard color charts is obtained, a change of the light emission ratios and setting of the changed light emission ratios into the light source control unit are repeated to decrease the square sum of the errors by the hill-climbing method, and the light emission ratios at a time when the square sum of the error becomes a specified threshold or less are determined to be the standard light emission ratios, in the display operation unit, the standard light emission ratios and the quasi-light emission ratios are selectable, and the light emission ratio setting unit sets selected ones of the standard light emission ratios and the quasi-standard light emission ratios into the light source control unit.

6. The image reading apparatus according to claim 4, further comprising a display operation unit, wherein, the display operation unit includes display means for displaying the standard lightnesses for the plural respective standard color charts, and desired lightness generation means for generating desired lightnesses by increasing/decreasing the standard lightnesses for the plural respective standard color charts, the storage unit further stores desired lightnesses generated for the plural respective standard color charts and desired light emission ratios determined by a third determination sequence, in the third determination sequence, measurement lightnesses for the plural respective standard color charts obtained from the sensor when the plural standard color charts are irradiated by the plural light sources with specified light emission ratios are inputted, a square sum of errors between the desired lightnesses and the measurement lightnesses for the plural standard color charts is obtained a change of the light emission ratios and setting of the changed light emission ratios into the light source control unit are repeated to decrease the square sum of the errors by the hill-climbing method, and the light emission ratios at a time when the square sum of the errors becomes a specified threshold or less are determined to be the desired light emission ratios, in the display operation unit, the standard light emission ratios and the desired light emission ratios are selectable, and the light emission ratio setting unit sets selected ones of the standard light emission ratios and the desired light emission ratios into the light source control unit.

7. The image reading apparatus according to claim 1, wherein, the composite light source is an array-shaped composite light source in which plural LED elements of plural colors are arranged, and diffusion means for diffusing emitted light is provided at an emission side of the LED elements.

8. The image reading apparatus according to claim 7, wherein the diffusion means is a Fresnel lens.

9. An image forming apparatus for reading a color document as a monochrome image and forming the monochrome image, the image forming apparatus comprising:

a composite light source that irradiates the color document and includes plural light sources different in spectral distribution;

a sensor configured to detect an intensity of a reflected light from the color document;

a light emission ratio setting unit configured to changeably set light emission ratios different for the respective light sources;

a light source control unit configured to control effective light amounts of the plural light sources with the set light emission ratios; and an image forming unit configured to form the monochrome image from an output of the sensor, wherein the light emission ratio setting unit includes a storage unit, and the light emission ratio setting unit sets standard light emission ratios stored in the storage unit into the light source control unit the standard light emission ratios are calculated such that a product of a composite spectral distribution obtained by combining spectral distributions of the plural light sources with specified light emission ratios, spectral distributions of standard color charts, and a spectral distribution of the a sensitivity of the sensor is integrated with respect to wavelengths to obtain first lightnesses for the standard color charts, a product of a spectral distribution of a standard light source, the spectral distributions of the standard color charts, and a spectral distribution of a visibility characteristic is integrated with respect to wavelengths to obtain second lightnesses for the standard color charts, and a square sum of errors between the first lightnesses and the second lightnesses for the plural standard color charts different in color becomes a minimum.

10. The image forming apparatus according to claim 9, wherein, the visibility characteristic is a color matching function $y(\lambda)$ in a CIE standard colorimetric system, and the standard light source is a xenon light source.

11. The image forming apparatus according to claim 9, wherein, the visibility characteristic is a color matching function $y(\lambda)$ in a CIE standard colorimetric system, and the standard light source is a CIE standard illuminant or a CIE supplementary illuminant.

12. The image forming apparatus according to claim 9, wherein, the light emission ratio setting unit includes a storage unit configured to store standard lightnesses set for plural standard color charts, and standard light emission ratios determined by a determination sequence, in the second determination sequence, measurement lightnesses for the plural respective standard color charts obtained from the sensor when the plural standard color charts are irradiated by the plural light sources with specified light emission ratios are inputted, a square sum of errors between the standard lightnesses and the measurement lightnesses for the plural standard color charts is obtained, a change of the light emission ratios and setting of the changed light emission ratios into the light source control unit are repeated to decrease the square sum of the errors by a hill-climbing method, and the light emission ratios at a time when the square sum of the errors becomes a specified threshold or less are determined to be the standard light emission ratios, and the light emission ratio setting unit sets the standard light emission ratios into the light source control unit.

13. The image forming apparatus according to claim 12, further comprising a display operation unit, wherein, the storage unit further stores quasi-standard lightnesses set for the plural respective standard color charts and quasi-standard light emission ratios determined by a second determination sequence, in the second determination sequence, measurement lightnesses for the plural respective standard color charts obtained from the sensor when the plural standard color charts are irradiated by the plural light sources with specified light emission ratios are inputted, a square sum of errors between the standard lightnesses and the measurement lightnesses for the plural standard color charts is obtained, a change of the light emission ratios and setting of the changed light emission ratios into the light source control unit are repeated to decrease the square sum of the errors by the hill-climbing method, and the light emission ratios at a time when the square sum of the errors becomes a specified threshold or less are determined to be the quasi-standard light emission ratios, in the display operation unit, the standard light emission ratios and the quasi-light emission ratios are selectable, and the light emission ratio setting unit sets selected ones of the standard light emission ratios and the quasi-standard light emission ratios into the light source control unit.

14. The image forming apparatus according to claim 12, further comprising a display operation unit, wherein, the display operation unit includes display means for displaying the standard lightnesses for the plural respective standard color charts, and desired lightness generation means for generating desired lightnesses by increasing/decreasing the standard lightnesses for the plural respective standard color charts, the storage unit further stores desired lightnesses generated for the plural respective standard color charts and desired light emission ratios determined by a third determination sequence, in the third determination sequence, measurement lightnesses for the plural respective standard color charts obtained from the sensor when the plural standard color charts are irradiated by the plural light sources with specified light emission ratios are inputted, a square sum of errors between the desired lightnesses and the measurement lightnesses for the plural standard color charts is obtained, a change of the light emission ratios and setting of the changed light emission ratios into the light source control unit are repeated to decrease the square sum of the errors by the hill-climbing method, and the light emission ratios at a time when the square sum of the errors becomes a specified threshold or less are determined to be the desired light emission ratios, in the display operation unit, the standard light emission ratios and the desired light emission ratios are selectable, and the light emission ratio setting unit sets selected ones of the standard light emission ratios and the desired light emission ratios into the light source control unit.

15. The image forming apparatus according to claim 9, wherein, the composite light source is an array-shaped composite light source in which plural LED elements of plural colors are arranged, and diffusion means for diffusing emitted light is provided at an emission side of the LED elements.

16. The image forming apparatus according to claim 15, wherein the diffusion means is a Fresnel lens.

17. An image forming method for reading a color document as a monochrome image and forming the monochrome image, characterized by comprising:

a step of irradiating the color document by a composite light source including plural light sources different in spectral distribution;

a detection step of detecting an intensity of a reflected light from the color document by a sensor;

a light emission ratio setting step of changeably setting light emission ratios different for the respective light sources;

a light source control step of controlling effective light amounts of the plural light sources with the set light emission ratios; and an image formation step of forming the monochrome image from an output of the sensor, wherein, at the light emission setting step, previously stored standard light emission ratios are set, the standard light emission ratio is calculated such that
a product of a composite spectral distribution obtained by combining spectral distributions of the plural light sources with specified light emission ratios, spectral distributions of standard color charts, and a spectral distribution of a sensitivity of the sensor is integrated with respect to wavelengths to obtain first lightnesses for the standard color charts, a product of a spectral distribution of a standard light source, the spectral distributions of the standard color charts, and a spectral distribution of a visibility characteristic is integrated with respect to wavelengths to obtain second lightnesses of the standard color charts, and a square sum of errors between the first lightnesses and the second lightnesses for the plural standard color charts different in color becomes a minimum.

18. The image forming method according to claim 17, wherein, the visibility characteristic is a color matching function $y(\lambda)$ in a CIE standard colorimetric system, and the standard light source is a xenon light source.

19. The image forming method according to claim 17 wherein, the visibility characteristic is a color matching function $y(\lambda)$ in a CIE standard colorimetric system, and the standard light source is a CIE standard illuminant or a CIE supplementary illuminant.

20. The image forming method according to claim 17, wherein, the light emission ratio setting step comprises:

a step of storing standard lightnesses set for plural respective standard color charts;

a step of inputting measurement lightnesses for the plural standard color charts obtained from the sensor when the plural standard color charts are irradiated by the plural light sources with specified light emission ratios;

a step of obtaining a square sum of errors between the standard lightnesses and the measurement lightnesses for the plural standard color charts;

a step of repeating a change of the light emission ratios and setting of the changed light emission ratios into the light source control unit to decrease the square sum of the errors by a hill-climbing method;

a step of determining the light emission ratios at a time when the square sum of the errors becomes a specified threshold or less to be the standard light emission ratios;

a step of storing the determined standard light emission ratios; and a step of setting the stored standard light emission ratios.

21. The image forming method according to claim 20, wherein, the light emission ratio setting step further comprises: a step of storing quasi-standard lightnesses set for the plural standard color charts;

a step of inputting measurement lightnesses for the plural respective standard color charts obtained from the sensor when the plural standard color charts are irradiated by the plural light sources with specified light emission ratios;

a step of obtaining a square sum of errors between the standard lightnesses and the measurement lightnesses for the plural standard color charts;

a step of repeating a change of the light emission ratios and setting of the changed light emission ratios to decrease the square sum of the errors by the hill-climbing method;

a step of determining the light emission ratios at a time when the square sum of the errors becomes a specified threshold or less to be the quasi-standard light emission ratios;

a step of storing the determined quasi-standard light emission ratios;

a step of selecting the standard light emission ratios and the quasi-standard light emission ratios; and a step of setting selected ones of the standard light emission ratios and the quasi-standard light emission ratios.

22. The image forming method according to claim 20, wherein, the light emission ratio setting step further comprises:

a step of displaying the standard lightnesses for the plural respective standard color charts;

a desired lightness generation step of generating desired lightnesses by increasing/decreasing the standard lightnesses for the plural respective standard color charts;

a step of storing the desired lightnesses generated for the plural respective standard color charts;

a step of inputting measurement lightnesses for the plural standard color charts obtained from the sensor when the plural standard color charts are irradiated by the plural light sources with specified light emission ratios;

a step of obtaining a square sum of errors between the desired lightnesses and the measurement lightnesses for the plural standard color charts;

a step of repeating a change of the light emission ratios and setting of the changed light emission ratios to decrease the square sum of the errors by the hill-climbing method;

a step of determining the light emission ratios at a time when the square sum of the errors becomes a specified threshold or less to be the desired light emission ratios;

a step of storing the determined desired light emission ratios;

a step of selecting the standard light emission ratios and the desired emission ratios; and a step of setting selected ones of the standard light emission ratios and the desired light emission ratios.

23. The image forming method according to claim 17, wherein, the composite light source is an array-shaped composite light source in which plural LED elements of plural colors are arranged, and emitted light is diffused to an emission side of the LED elements and is irradiated to the color document.

24. The image forming method according to claim 23, wherein the emitted light is diffused by using a Fresnel lens.

* * * * *